Nov. 17, 1959 A. E. BRICKMAN 2,912,878
BRAKE CABLE ASSEMBLY
Filed May 16, 1957 3 Sheets-Sheet 1
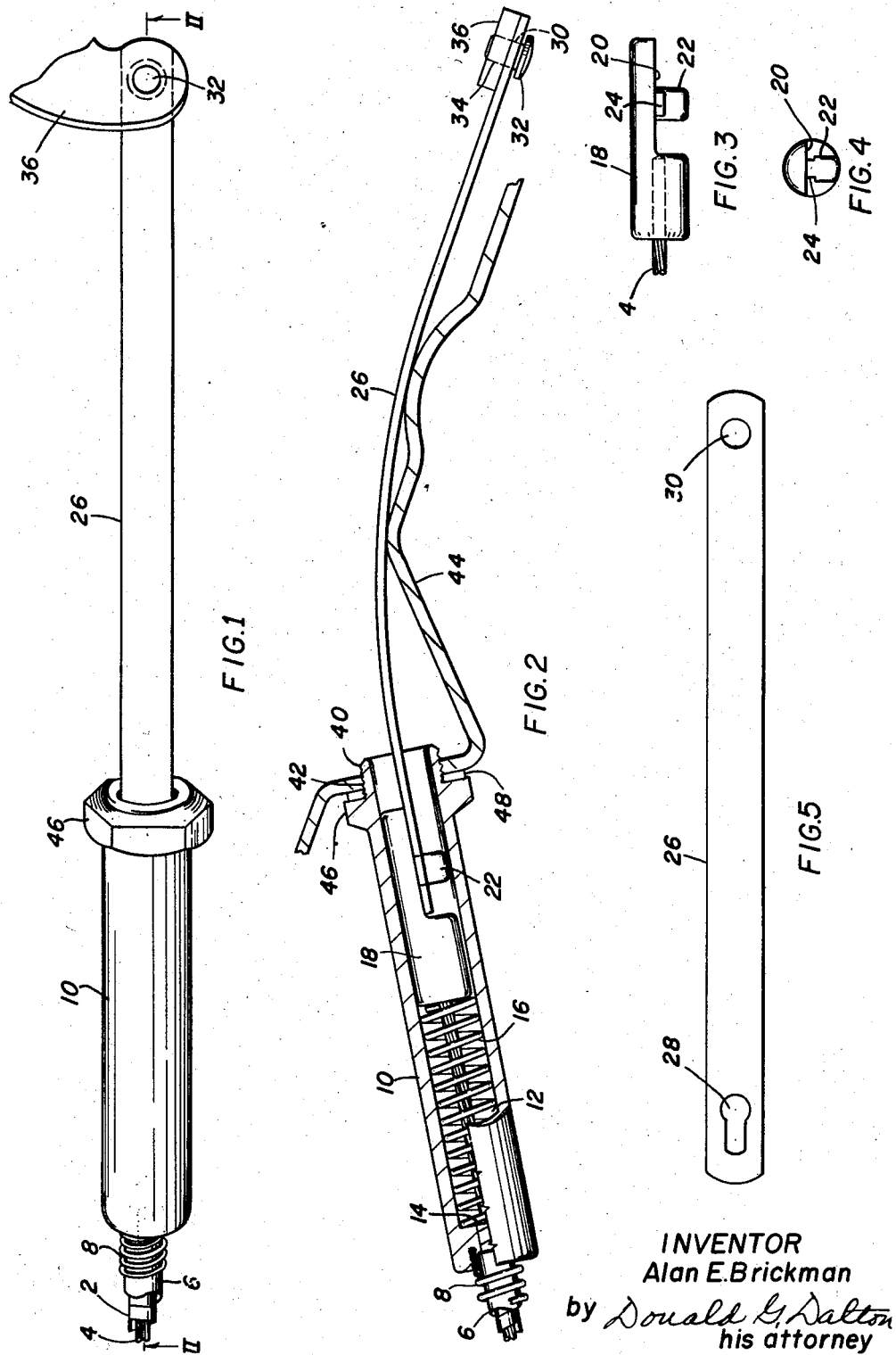
INVENTOR
Alan E. Brickman
by Donald G. Dalton
his attorney Nov. 17, 1959     A. E. BRICKMAN     2,912,878
BRAKE CABLE ASSEMBLY
Filed May 16, 1957     3 Sheets-Sheet 2
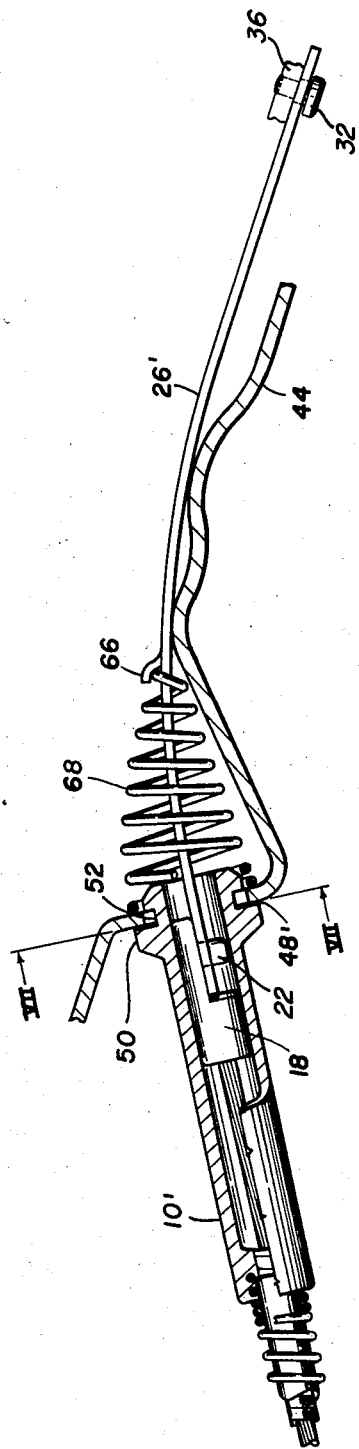
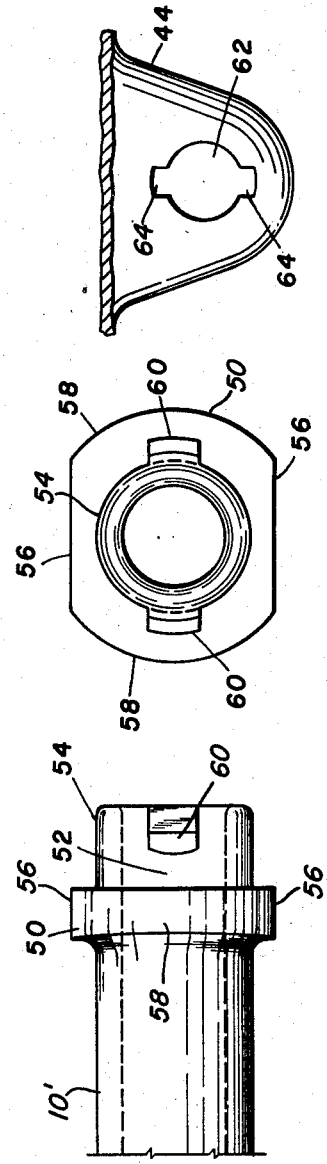
INVENTOR
Alan E. Brickman
by Donald G. Dalton
his attorney

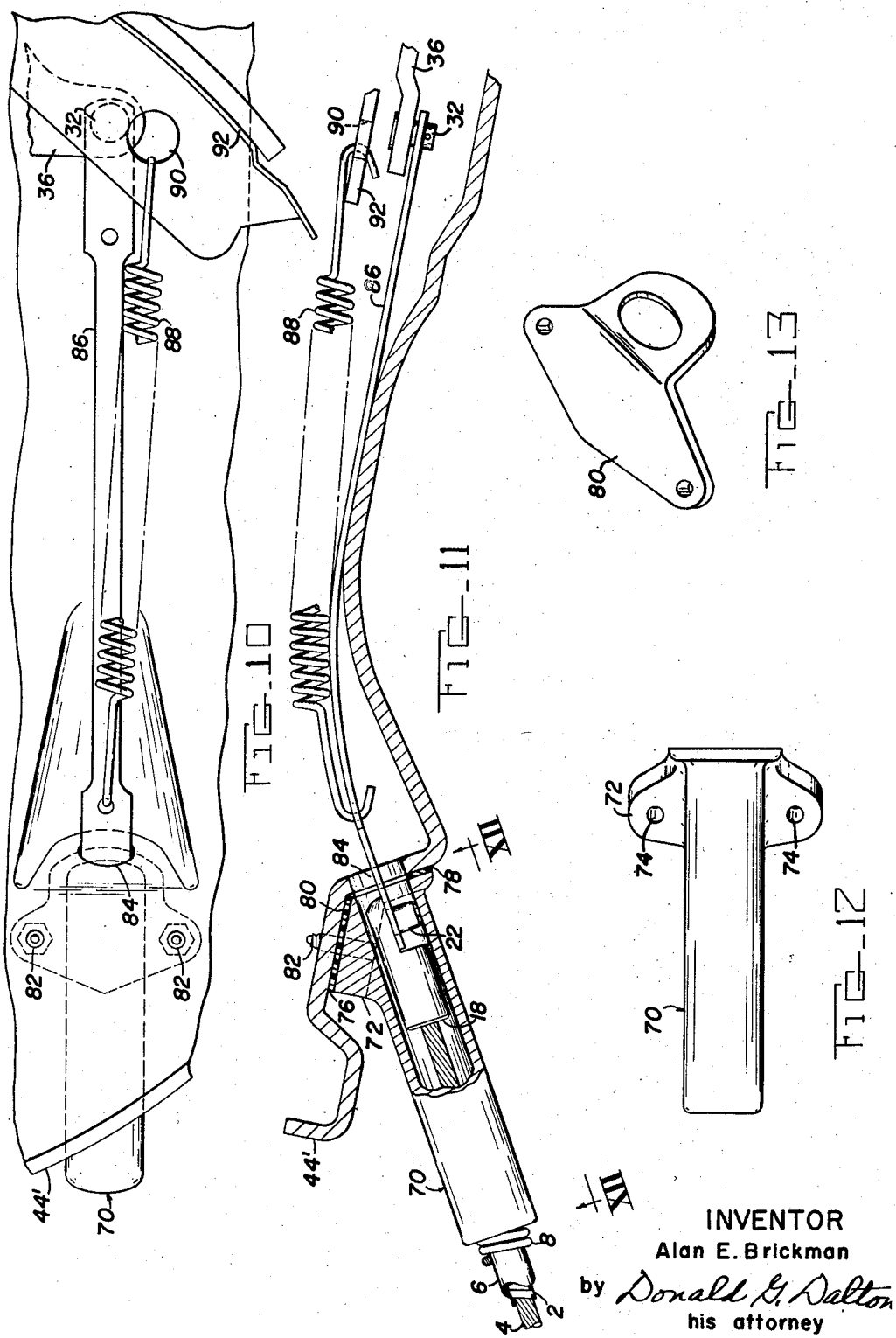

United States Patent Office 2,912,878
Patented Nov. 17, 1959

2,912,878

BRAKE CABLE ASSEMBLY

Alan E. Brickman, Hartford County, Conn., assignor to United States Steel Corporation, a corporation of New Jersey Application May 16, 1957, Serial No. 659,506

4 Claims. (Cl. 74—502)

This invention relates to a brake cable assembly and more particularly to means for connecting the brake cable to the brake shoe lever. As disclosed in my prior Patent No. 2,691,900, dated October 19, 1954 and my copending application Serial No. 410,691, filed February 16, 1954, the brake cable slides in a flexible conduit having a fitting on the end thereof. While not disclosed in my patent nor copending application, the cable extends beyond the conduit and the cable with the fitting on the end thereof must be threaded through an aperture in the brake flange plate with the swaged sleeve assembled in back of a hook bend on the brake shoe lever. The conduit terminal is spring fastened at the flange plate aperture and with the brake drum secured to the axle this end of the cable is enclosed and non-accessible. Damage to the externally exposed portion of the cable assembly is common especially when shipping the assembly from one plant to another. The cable also passes through an open coil spring at its terminal end with wear of the cable on the coil spring, thus requiring replacement of the parts. This assembling and replacement of the assembly is a difficult and expensive procedure.

It is therefore an object of my invention to provide a brake cable assembly in which the brake cable and conduit are attached to the brake flange plate in such a manner that they are readily assembled and disassembled.

This and other objects will be more apparent after referring to the following specification and attached drawings, in which:

Figure 1 is a schematic view showing the attachment of the brake cable to the brake shoe lever;

Figure 2 is a sectional view taken on the line II—II of Figure 1 showing the attachment of the brake cable and conduit to the flange plate of the brake shoe;

Figure 3 is a view showing the terminal on the end of the cable;

Figure 4 is an end view of the terminal of Figure 3;

Figure 5 is a view of a connecting member utilized in my invention;

Figure 6 is a view, similar to Figure 2 showing a second embodiment of my invention;

Figure 7 is a view taken on the line VII—VII of Figure 6 with the brake cable assembly removed;

Figure 8 is an enlarged view showing the end of the conduit terminal of Figure 6;

Figure 9 is an end view of the fitting of Figure 8;

Figure 10 is a view, similar to Figure 1, showing a third embodiment of my invention;

Figure 11 is an elevation of the assembly of Figure 10 with certain parts broken away and shown in section;

Figure 12 is a view taken on the line XII—XII of Figure 11; and

Figure 13 is a perspective view of a detail.

Referring more particularly to Figures 1 and 2 of the drawings, the reference numeral 2 indicates a flexible conduit for receiving a brake cable 4. A jacket 6 of rubber, neoprene, nylon or other flexible material surrounds the member 2. A portion of the rubber covering 6 is stripped from the end of the conduit and a helically wound coil spring 8 is placed over a portion of the rubber covering 6 and also over part of the bared portion of the conduit. The terminal fitting 10 is then die cast over the bared portion of the conduit 2 and that part of the spring 8 that extends around the bared portion. The construction so far described is essentially the same as that in my above mentioned patent and copending application except for the construction of the fitting 10 which is much different. The other end of the conduit may be constructed as shown in my above mentioned patent or copending application but is preferably of the construction shown in my copending application entitled "Brake Cable Assembly," Serial No. 577,575, filed April 11, 1956. The terminal fitting 10 has an axial opening 12 therein communicating with the opening in the conduit 2. The diameter of the opening 12 is greater than that of the conduit 2 as to provide a shoulder 14 for receiving one end of a coil spring 16 which surrounds the end of cable 4. The other end of the spring 16 bears against a terminal 18 attached to the end of cable 4. As best shown in Figures 3 and 4, terminal 18 is provided with a step face 20 having a stud 22 thereon extending at right angles to the axis of the terminal. Parallel grooves 24 are provided in the stud 22 as shown. A spring steel flexible connector 26 is provided with a key hole 28 at one end for receiving the stud 22. The other end of the connector 26 is provided with a hole 30 for receiving a rivet 32. The rivet 32 passes through the hole 30 into a hole 34 at one end of a brake shoe lever 36. Brake shoe lever 36 is pivotally mounted at its other end and actuates the brake shoe in the usual manner. The lever 36 is also spring biased in the usual manner to released position, this being in a counterclockwise direction as shown in Figure 1. One end of terminal fitting 10 is provided with threads 40 for attachment in a threaded opening 42 in flange plate 44. An annular flange 46 is provided on the fitting 10 adjacent the threaded portion 40 and a washer or gasket 48 is provided between the flange 46 and flange plate 44.

In assembly the spring connector 26 is riveted to the lever 36 on the gear and axle assembly line and thus forms part of the gear and axle assembly. This gear and axle assembly may be shipped from plant to plant without danger of damage to the spring 26. The brake cable 4 with terminal 18 attached thereto and with the spring 16 surrounding the cable adjacent the terminal 18 is received in the opening 12 of fitting 10 as shown. In making up the assembly the terminal 18 may be swaged to the end of the cable 4 after the cable has been pulled through the fitting 10. The key hole 28 of spring connector 26 is then passed over stud 22 with the narrow end of the key hole being received in the groove 24. The washer 48 is passed over the threaded end 40 and the fitting 10 threaded into the hole 42. It will be seen that the cable assembly can be readily disassembled and replaced. The purpose of spring 16 is to augment the spring bias of lever 36 to return the lever 36 to the released position. In other words, when the cable is pulled to the left to operate the hand brake the spring 16 is compressed by the terminal 18 sliding to the left and when the brake handle is released the spring 16 helps to move the terminal 18 to the right. If the spring bias of lever 36 is sufficient to retract the brake the spring 16 may be omitted. It will also be understood that the grooves 24 in stud 22 may be omitted and the hole 28 made circular.

In the embodiment of my invention shown in Figures 6 to 9, terminal fitting 10 is replaced by terminal fitting 10', The principal difference between fittings 10' and 10 is in the construction of the right hand end thereof. As shown in Figures 8 and 9 an annular flange 50 is provided adjacent the right hand end of fitting 10' with spaced grooves 52 being provided in end portion 54. The flange 50 has flat sides 56 connected by circular sides 58. The main part of portion 54 is circular but is provided with a pair of spaced apart flanges 60 so that a groove 52 is provided between flange 50 and each flange 60. The flange plate 44 is provided with an opening 62 having a main circular portion with a diameter slightly greater than the diameter of the main part of portion 54 and diametrically opposed grooves 64 of such size as to pass the flanges 60. Spring connector 26' differs from spring connector 26 in that it is provided with an abutment 66 for a conical spring 68. The assembly of this embodiment of my invention is essentially the same as that of the first embodiment. The spring connector 26' and the conical spring 68 are assembled as part of the gear and axle assembly. Spring 26' is connected to terminal 18 in the same manner as in the first embodiment. The fitting 10' is passed from the left through the opening 62 with the flanges 60 in alignment with slots 64. The fitting 10' is then turned at right angles so that the flange plate 44 is received in the grooves 52. A washer or gasket 48' may be provided as shown. The spring 68 functions in the same manner as spring 16.

In the embodiment of my invention shown in Figures 10 to 13 flange plate 44' is formed in a different manner than the flange plate 44 of the other two embodiments. Because of the manner in which fittings 10 and 10' are connected to the flange plate 44 it is necessary to have a relatively deep groove in the flange plate at the point of connection. This increases the difficulty of forming the flange plate 44. Therefore, it is preferred to modify the fittings 10 and 10' and replace them with a fitting 70 in this embodiment. The fitting 70 has an inner construction substantially the same as that of fittings 10 and 10' and the conduit 2 and spring 8 are connected to the fitting 70 in the same way as to the fittings 10 and 10'. However, an angled boss 72 having holes 74 therein is provided on the terminal 70 at the end adjacent the flange plate 44'. The boss 72 and the end of the fitting 70 abut against the flange plate 44' between points 76 and 78. A gasket 80 shaped as shown in Figure 13 and made of neoprene or other similar material may be provided between the fitting 70 and flange plate 44'. The fitting 70 is attached to the flange plate 44' by means of self-threading screws 82 which pass through the holes 74 into the flange plate 44'. A hole 84, which may be cross-shaped or circular, is provided in the flange plate 44' adjacent the point 78. A spring connector 86 is connected to stud 22 in the same manner as spring connector 26'. The spring connector 86 is preferably reduced in width intermediate its ends to provide greater flexibility. Connector 86 is connected to the brake shoe lever 36 by means of a rivet or stud 32 in the same manner as in the other embodiments. A spring 88 has one end connected to flexible spring connector 86 and its other end connected in an indexing hole 90 in brake shoe 92.

In assembly, the spring connector 86 is secured to the lever 36 and tension spring 88 is connected between the connector 86 and brake shoe 92, as shown, with the spring 88 being in tension. This forms part of the gear and axle assembly and may be shipped from plant to plant. The connector 86 is connected to stud 22 of terminal 18 in the same manner as in the other embodiments. The assembly of terminals 18 and 70 is then backed against the flange plate 44' with the gasket 80 therebetween and the terminal 70 is secured to the flange plate 44' by means of the screws 82. In this final assembly the initial tension in spring 88 draws the cable 4 back as the brake is released.

While three embodiments of my invention have been shown and described it will be apparent that other adaptations and modifications may be made without departing from the scope of the following claims.

I claim:

1. A brake assembly comprising a flange plate, a brake shoe lever on the inside of said flange plate, said flange plate having a hole therethrough, a flexible conduit through which the cable passes, a terminal fitting secured to one end of said conduit, said terminal fitting having an axial opening therethrough, said conduit and at least the major portion of said terminal fitting being located on the side of said flange plate opposite said brake shoe lever with the axis of the terminal fitting in alignment with said hole, means for detachably securing said fitting to said flange plate, a terminal secured to an end of said cable, said terminal being slidably mounted in said terminal fitting, the end of said brake shoe lever being out of alignment with the axis of said terminal, and a flexible flat spring material connector extending through said hole with one end attached to said terminal and the other end attached to said brake shoe lever.

2. A brake assembly comprising a flange plate, a brake shoe lever on the inside of said flange plate, said flange plate having a hole therethrough, a flexible conduit through which the cable passes, a terminal fitting secured to one end of said conduit, said terminal fitting having an axial opening therethrough, said conduit and at least the major portion of said terminal fitting being located on the side of said flange plate opposite said brake shoe lever with the axis of the terminal fitting in alignment with said hole, means for detachably securing said fitting to said flange plate, a terminal secured to an end of said cable, said terminal being slidably mounted in said terminal fitting, the end of said brake shoe lever being out of alignment with the axis of said terminal, a flexible flat spring material connector extending through said hole with one end attached to said terminal and the other end attached to said brake shoe lever, and means for biasing said flexible connector toward said brake shoe lever.

3. A brake assembly comprising a flange plate, a brake shoe lever on the inside of said flange plate, said flange plate having a hole therethrough, a flexible conduit through which the cable passes, a terminal fitting secured to one end of said conduit, said terminal fitting having an axial opening therethrough, said conduit and at least the major portion of said terminal fitting being located on the side of said flange plate opposite said brake shoe lever with the axis of the terminal fitting in alignment with said hole, means for detachably securing said fitting to said flange plate, a terminal secured to an end of said cable, said terminal being slidably mounted in said terminal fitting, the end of said brake shoe lever being out of alignment with the axis of said terminal, a stud mounted on said terminal at the end adjacent said flange plate, a flexible flat spring material connector having a hole at one end thereon fitting over said stud, said spring connector extending from said stud through the hole in said flange plate to said brake shoe lever, and means for attaching the other end of said spring connector to said brake shoe lever.

4. A brake assembly comprising a flange plate, a brake shoe lever on the inside of said flange plate, said flange plate having a hole therethrough, a flexible conduit through which the cable passes, a terminal fitting secured to one end of said conduit, said terminal fitting having an axial opening therethrough, said conduit and at least the major portion of said terminal fitting being located on the side of said flange plate opposite said brake shoe lever with the axis of the terminal fitting in alignment with said hole, means for detachably securing said fitting to said flange plate, a terminal secured to an end of said cable, said terminal being slidably mounted in said terminal fitting, the end of said brake shoe lever being out of alignment with the axis of said terminal, a stud mounted on said terminal at the end adjacent said flange plate, a flexible flat spring material connector having a hole at one end thereon fitting over said stud, said spring connector extending from said stud through the hole in said flange plate to said brake shoe lever, means for attaching the other end of said spring connector to said brake shoe lever, and means for biasing said spring connector toward said brake shoe lever.

References Cited in the file of this patent

UNITED STATES PATENTS

| | | |
|---|---|---|
| 389,314 | McIntire | Sept. 11, 1888 |
| 1,034,681 | Bliss | Aug. 6, 1912 |
| 1,394,784 | Pearson | Oct. 25, 1921 |
| 1,862,105 | Wharam | June 7, 1932 |
| 1,902,585 | Sanford | Mar. 21, 1933 |
| 1,927,615 | Ponti et al. | Sept. 19, 1933 |
| 1,940,456 | Kohr | Dec. 19, 1933 |
| 2,296,993 | Gerry | Sept. 29, 1942 |
| 2,416,206 | Norton | Feb. 18, 1947 |
| 2,431,079 | Richey | Nov. 18, 1947 |
| 2,441,719 | Potter | May 18, 1948 |
| 2,496,938 | Friedman | Feb. 7, 1950 |
| 2,744,769 | Roeder et al. | May 8, 1956 |
| 2,751,793 | Sandberg | June 26, 1956 |

FOREIGN PATENTS

| | | |
|---|---|---|
| 606,833 | France | Mar. 5, 1926 |
| 892,331 | France | Jan. 7, 1944 |